US012351444B2

(12) United States Patent
Comin et al.

(10) Patent No.: US 12,351,444 B2
(45) Date of Patent: Jul. 8, 2025

(54) SYSTEM COMPRISING A STATIC MICRODOSER FOR INTRODUCING AN ADDITIVE INTO A CONTAINER

(71) Applicant: SOCIETE DES PRODUITS NESTLE S.A., Vevey (CH)

(72) Inventors: Andrea Comin, Nancy (FR); Rony Abou-Naoum, Vittel (FR)

(73) Assignee: Societe des Produits Nestle S.A., Vevey (CH)

( * ) Notice: Subject to any disclaimer, the term of this patent is extended or adjusted under 35 U.S.C. 154(b) by 80 days.

(21) Appl. No.: 18/558,969

(22) PCT Filed: May 4, 2022

(86) PCT No.: PCT/EP2022/061892

§ 371 (c)(1),
(2) Date: Nov. 3, 2023

(87) PCT Pub. No.: WO2022/233898

PCT Pub. Date: Nov. 10, 2022

(65) Prior Publication Data

US 2024/0228254 A1 Jul. 11, 2024

(30) Foreign Application Priority Data

May 6, 2021 (EP) .................................... 21172405

(51) Int. Cl.
*B67C 3/22* (2006.01)
*B67C 3/02* (2006.01)
(Continued)

(52) U.S. Cl.
CPC .............. *B67C 3/208* (2013.01); *B67C 3/023* (2013.01); *B67C 3/24* (2013.01); *B67C 3/287* (2013.01); *B01F 35/7179* (2022.01)

(58) Field of Classification Search
CPC ........... B67C 3/208; B67C 3/023; B67C 3/24; B67C 3/287; B01F 35/7179
See application file for complete search history.

(56) References Cited

U.S. PATENT DOCUMENTS 4,079,762 A * 3/1978 Hanson, Jr. ........... B65B 39/004 239/453
8,596,307 B2 * 12/2013 Krulitsch .................. B67C 3/02 141/105
(Continued)

FOREIGN PATENT DOCUMENTS

DE 102022118571 A1 * 1/2024 ............... B67C 3/22
WO 2020202057 10/2020

*Primary Examiner* — Nicolas A Arnett
(74) *Attorney, Agent, or Firm* — K&L Gates LLP

(57) ABSTRACT

The invention relates to a system for introducing an additive into a container (4) partially filled with a main liquid material. It comprises an automated conveyor for transporting the container (4) along a straight horizontal trajectory (T) at a substantially constant container speed (Vc). It further comprises a static microdoser (6) having a nozzle (9) from which at least one jet (8) of an additive issues upon passage of an opening (7) of the container (4). The system is configured to introduce a given mass of additive into the container. The nozzle of the microdoser (6) is inclined relative to a vertical direction that is perpendicular to the trajectory (T). The inclination of the nozzle, the number, the shape and the speed (Vj) of the at least one jet, the mass of additive, and the container speed (Vc) are configured such that the specific kinetic energy of the impact of the at least one jet on the free surface of the main liquid material is less than 3000 mJ/m$^2$.

15 Claims, 4 Drawing Sheets

(51) Int. Cl.
*B67C 3/20* (2006.01)
*B67C 3/24* (2006.01)
*B67C 3/28* (2006.01)
*B01F 35/71* (2022.01)

(56) References Cited

U.S. PATENT DOCUMENTS

| | | | | |
|---|---|---|---|---|
| 8,631,839 | B2 * | 1/2014 | Meinzinger | B67C 3/20 141/105 |
| 9,511,986 | B2 * | 12/2016 | Clusserath | B67C 3/026 |
| 10,814,291 | B2 * | 10/2020 | Chen | B01F 23/451 |
| 2017/0158478 | A1 * | 6/2017 | Comin | B67C 7/0046 |
| 2018/0354766 | A1 * | 12/2018 | Comin | B67C 7/002 |
| 2022/0177289 | A1 * | 6/2022 | Limpens | B67C 3/208 |
| 2023/0091547 | A1 * | 3/2023 | Comin | B65B 3/12 141/1 |

* cited by examiner

SYSTEM COMPRISING A STATIC MICRODOSER FOR INTRODUCING AN ADDITIVE INTO A CONTAINER

CROSS REFERENCE TO RELATED APPLICATIONS

The present application is a National Stage of International Application No. PCT/EP2022/061892, filed on May 4, 2022, which claims priority to European Patent Application No. 21172405.9, filed on May 6, 2021, the entire contents of which are being incorporated herein by reference.

FIELD OF THE INVENTION

The present invention concerns the technical field of industrial facilities for filling containers such as cans with a liquid product, such as filling and bottling lines.

In the present document, the invention is described in relation with can filling, also called “canning”. The term “can” designates any type of can of any size, from small beverage cans to large tin cans.

Although the invention is more particularly described in the present document in relation to can filling, and is particularly suited for such application, it encompasses filling of other similar containers such as any container having an open upper face upon their filling typically with a liquid or semi liquid product.

The invention relates more particularly to the addition of an additive into a can filled with another liquid material hereafter called “main liquid material”. In the food industry, the additive may typically be an edible flavouring concentrate, and the main liquid material in the can may be any liquid beverage product base such as water, soda, lemonade, a soup, and so on.

The term “additive” relates in the present document to a liquid component, or to a liquid component comprising small solid particles.

The present invention even more particularly relates to static-microdosers, which is one of the known technologies for introducing a small quantity of an additive into a container, as hereafter detailed. While the term “microdoser” generally designates a device for dosing a fluid in the microliter range, it should be noted that it is used in the present document to designate a device, which is able to dose a fluid up to one or a few milliliters.

BACKGROUND OF THE INVENTION

The preparation of a liquid product, for example in the food industry, may require incorporating a small quantity of an additive into a container, empty or partly filled with a main liquid material. This consists in injecting into the main liquid material a small amount of a concentrated compound (i.e. the additive) such as an aroma, which is a liquid having a highly concentrated flavor.

The main liquid material can be for example water or sparkling water. Such preparation can be used to create flavoured water, flavoured sparkling water, a soda, or a functional beverage.

A common way to fill cans or other containers in an industrial facility uses canning lines. The current solutions for injecting an additive into a can rely on so-called dynamic injectors installed on a carousel. In such solution, containers such as cans previously filled with the main liquid material (typically carbonated water) are transported on a conveyor belt or a similar transport system, along a horizontal and linear trajectory.

The carousel comprising a plurality of injectors is synchronized with the passage of the containers to maximize the time for which an injector is above the opening of a container (e.g. the open upper face of a can) to maximize the time available for injecting an additive, also called “dosing time”.

An additive injector of the carousel is so positioned above a can for additive injection, with its main axis (defining the injection direction) parallel to the main axis of the can (which is generally vertical). Because such system maximizes the time available for injecting the liquid additive, the flow rate of the injection can be sufficiently low to minimize the impact energy of the additive jet over the surface of the main liquid material and to avoid generation of a splash.

However, such dosing systems are expensive, hard to install and have long cleaning time (e.g. when a change of injected additive is performed).

Another known solution to introduce a small quantity of liquid into a container is the use of a device called “static microdoser”. A static microdoser consists of a fixed device configured to generate a jet of additive when a container aperture passes under a nozzle of the microdoser.

While static microdosers are simple and easy to use devices, they have drawbacks. The quantity of liquid that may be introduced with such a device is very limited, due to the limited time available for injection The time available for injection is defined by the time of passage of the opening (mouth, opened neck) of a container under the injection nozzle.

Contrary to the above-described system comprising a carousel, a static microdoser is fixed, and thus unable to follow the movement of the container during the injection of additive. Use of a static microdoser is thus limited to the introduction of very small quantities of additive into a container, or limited to low-speed applications in which the container speed can be reduced or stopped until the completion of the dosing.

The use of a static microdoser is thus not envisioned in the state of the art to introduce an additive into a can (e.g. a beverage can), in particular at a speed above 20 000 cans per hour, as microdosing solutions are normally used in low speed applications. Indeed, due to the relatively large quantity (such as a few milliliters) of additive that must be injected into the can and the small time available for injection, the injection flowrate of the injected additive must be high. When additive is injected into a container at a high flow rate, the risk of splashing in reaction to the incoming jet of additive is high. This may result in a loss of liquid from the container, i.e. a loss of main liquid material present in the bottle before injection of additive, and/or a loss of additive injected into the bottle.

Such loss of liquid is problematic.

First, such loss makes the quantity of additive in the final product (composed of the main liquid material and additive(s)) variable. Moreover, the additive is generally a very concentrated product. For example, in the case of flavoured waters or soda, the typical ratio of additive to main liquid material in the final product is comprised between 1 to 5 volumes of flavourings (additive) to 1000 volumes of water (or other main liquid material). A small variation in quantity of additive can thus strongly affect the quality of the final product, for example its taste. Any product splash can be a source of uncertainty in the dosing ratio (additive weight to main liquid material weight), and can increase the net weight variability beyond acceptable limits.

Second, splashing on an outside surface of the container or splashing on the canning line is not acceptable for a food product. It can promote microbiological development. Splashing of additive may be acceptable only if the fluid evaporates without leaving any trace on the bottle, as liquid nitrogen does. That is why static microdosers are commonly used in high-speed applications (typically above 20 000 cans per hour) only for introduction of liquid nitrogen into a container.

The invention aims to provide a device for introducing an additive into a container such as a can using a static microdoser that efficiently reduces the risk of splashing when the additive is injected into the container, to improve the dosing precision and to improve hygiene.

SUMMARY OF THE INVENTION

The objective set out above is met with a system for introducing an additive into a container, the system comprising an automated conveyor for transporting the container along a straight horizontal trajectory at a substantially constant container speed. The system further comprises a static microdoser having a nozzle from which at least one jet of an additive issues upon passage of an opening of the container in proximity to the nozzle to introduce the additive into said container. The nozzle of the microdoser is inclined relative to a vertical direction that is perpendicular to the trajectory of the container.

The system is configured to introduce a given quantity of additive into the container, said quantity having a mass m. This corresponds to the mass of the jet or jets of additive introduced into a container.

The at least one jet hits a free surface of the main liquid material at a relative impact speed V, over an area A of the free surface of the main liquid material. The area A depends on the size (transversal section) of the at least one jet, on the relative horizontal speed between the at least one jet and the container and on the additive injection time (dosing time).

The system is configured, with regard to the inclination of the nozzle, to the number, the shape and the speed of the at least one jet, to the mass m, to the container speed, such that the specific kinetic energy I transferred at the impact of the at least one jet to the free surface of the main liquid material, is less than 3000 mJ/m$^2$, and preferably less than 2000 mJ/m$^2$.

This specific kinetic energy I is defined by the formula:

$$I = \frac{\frac{1}{2} m * V^2}{A}$$

In this formula:

- I is the specific kinetic energy transferred at the impact of the at least one jet to the free surface of the main liquid material;
- A is the impact area of the free surface of the main liquid material that is hit by the jet or jets of additive;
- m is the total mass of the jet or jets (i.e. the mass of additive introduced into a container); and
- V is the relative impact speed of the at least one jet (i.e. the jet or jets) on the free surface of the main liquid material present in the container.

In the particular case of multiple parallel jets of the same size and same relative impact speed V, the combined specific kinetic energy of the multiple jets can be calculated with the formula above, considering the total impact area A and total mass m of the multiple jets.

The system provided according to the invention makes it possible to avoid or limit splashing upon injection by a static microdoser of an additive into a container transported along a straight horizontal trajectory.

This technical advantage is obtained thanks to an adapted limitation of the specific kinetic energy transferred at the impact of the at least one jet to the free surface of the main liquid material. The inclination of the nozzle of the static microdoser leads to a jet of additive that is inclined relative to the travel path of the containers.

Consequently, the inclination of the nozzle according to the invention also reduces the vertical impact speed of the jet on the free surface of the liquid impacted by the jet, and also limits or cancels the relative horizontal speed between the jet and the container. For a given quantity of additive introduced into the container, the inclination of the nozzle limits the specific kinetic energy transferred at the impact of the jet or jets to the free surface of the main liquid material, and finally limits splashing. Conversely, the production line (e.g. the canning line) can be operated at a speed that would not be attainable without the inclination of the nozzle and a suitable nozzle configuration (e.g. in terms of the size of the injection orifice (s)). For example, between 0.3 g and 1 g of additive can be introduced without splashing into standard cans having a 50 mm diameter, with a production speed of 20,000 to 100,000 cans per hour. This performance is not achievable with the static dosing systems known in the state of the art.

Thanks to the inclination of the nozzle, the at least one jet has vertical and horizontal speed components that are non-null, the horizontal speed component of the jet being substantially parallel to the trajectory of the container. The inclination of the nozzle, the speed of the at least one jet issued from the nozzle, and the container speed (Vc) are configured such that a relative horizontal speed between the jet and the container is less than 1 m/s, preferably less than 0.7 m/s, and more preferably less than 0.5 m/s.

More particularly, the Applicant has found that, for a given nozzle and dosed amount, a limitation of the relative horizontal speed between the jet of additive and the free surface of the liquid impacted by the jet is important to limit splashing. Furthermore, the inclination of the nozzle according to the invention also reduces the vertical impact speed of the jet on the free surface of the liquid impacted by the jet, which is also an important parameter to limit splashing.

The inclination of the nozzle, the jet speed of the at least one jet issued from the nozzle, and the container speed (Vc) can be configured such that the relative horizontal speed between the jet and the container is less than 0.5 m/s. In particular, the inclination of the nozzle, the jet speed and the container speed (Vc) are configured such that the relative horizontal speed between the at least one jet and the container is substantially null.

The jet vertical speed of the at least one jet can be less than 1.2 m/s.

The applicant has found such speed setting to be effective in preventing splashing.

The nozzle can be oriented such that the at least one jet issued from the nozzle forms an angle with the vertical direction comprised between 20° and 50°, preferably between 30° and 45°.

Such inclination angles make it generally possible to achieve the aims of the present invention, depending on the other operating parameters of the system. For a given nozzle, jet speed, dosed amount (i.e.; additive quantity), the inclination of the nozzle can be adapted to obtain a pair of a relative horizontal speed between the at least one jet and the container and of a jet vertical speed that is acceptable, in terms of waves generation, based on a cartography predetermined for the nozzle.

Such cartography, can be based on experimental values or based on the calculation of the specific kinetic energy corresponding to each set of parameters.

The automated conveyor can have a running speed comprised between 1 m/s and 3 m/s.

The indicated running speed range of the conveyor is a typical speed range used in canning lines. The invention is compatible with canning lines having an output of a level conventional in large industrial installations.

The nozzle can comprise a plurality of holes, so that a plurality of jets having parallel trajectories are issued from the nozzle upon passage of the opening of the container in proximity to the nozzle. The nozzle can comprise two to thirty holes.

For a given quantity of injected additive in a given time, compared to a nozzle having a single hole, a nozzle having multiple holes (with the same total area and positioned transversally to the can moving direction) reduces the width of each individual jet issued from the nozzle and increases the surface of the liquid present in the container that is hit during the injection of additive. Reducing the width of each jet is generally beneficial to avoid splashing (in the manner that a small droplet creates less splash when it falls on the surface of a liquid than a large drop falling at a same speed). Increasing the hit surface is also beneficial as it reduces the mechanical energy per unit area that must be absorbed, thus also reducing the risk of splashing.

The system can comprise a container that has an open upper face forming its opening. This container can be a can.

The present invention is particularly suitable for the injection of an additive into a container comprising an open upper face such as is the case for example for beverage cans before they are closed.

The system can be configured so that each jet of additive hits a free surface of the main liquid material along a straight horizontal path over a length of at least 40% of the length of the free surface of the main liquid material along this path. The container can have a cylindrical shape and the at least one jet of additive can hit the free surface of the main liquid material along a diameter of the container parallel to the moving direction.

By maximizing the length of the free surface impacted by each jet, the surface of the liquid hit by the jet is increased, which limits the mechanical energy per unit area that must be absorbed and limits the risks of splashing.

When the container is cylindrical, the at least one jet of additive (i.e. the jet or the combination of the jets) can hit the free surface of the main liquid material over a width comprised between 18% and 68% of the diameter the container, and preferably around 49% of the diameter the container.

Such injection width makes it possible to optimize the cumulated splashing avoidance effects of the inclination of the nozzle and of the increase of the area of the free surface of the main liquid material impacted by the jet (or jets) of additive.

In a system as above described, the main liquid material can be, for example, one of water, a soda, lemonade, and a soup. The additive can be an edible flavouring concentrate, a mineral concentrate, or a functional concentrate such as an additive comprising a vitamin, caffeine or another coffee extract.

The invention is thus applicable to the preparation of many canned liquid products, especially beverages.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION

Figure 1:
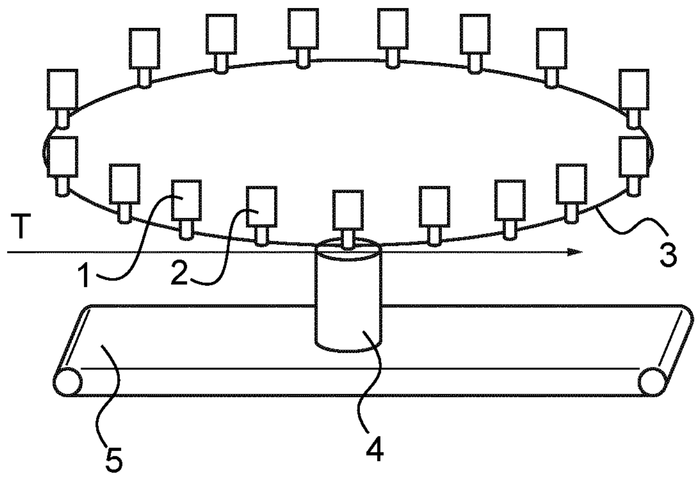
FIG. 1 is a three-dimensional schematic view of a system for introducing an additive into a container having an open upper face, according to the state of the art.

FIG. 1 is a three-dimensional schematic view of a system for introducing an additive into a container having an open upper face, according to the state of the art. The system of FIG. 1 uses dynamic injectors 1, 2. The dynamic injectors 1, 2, are installed on a large rotating wheel called carousel 3.

Containers 4 such as cans are transported on a conveyor belt 5, along a horizontal and linear trajectory T. Although only one container 4 is shown in FIG. 1, it should be understood that the conveyor belt 5 generally carries a number of containers next to each other.

The carousel 3 comprising a plurality of dynamic injectors 1, 2 is synchronized with the passage of each container 4 to maximize the time in which an injector is above the opening of the container 4. This implies that the speed at the periphery of the carousel equals the running speed of the conveyor belt 5.

This maximizes the time available for injecting an additive into each container 4, also called "dosing time".

Such device is generally used in the food industry to add an additive into a food product. More particularly, it is commonly used to introduce an aroma into a beverage, such as water or a soda. The container 4 (e.g. a can for a beverage) has thus already been partially filled with a main liquid material when it arrives under a dynamic injector for injection of an additive. By "partially" it is meant that a sufficient free volume remains in the container to receive the additive.

In all the present disclosure, additive should be understood as designating a liquid in an amount up to 5%, preferably 0.05% to 1%, preferably 0.1% 0.5% by volume, of the main liquid material in the final product. As non-exhaustive examples, additive can be a flavouring or aroma (for example orange, peach, lemon, etc.), a tea or coffee extract, a fruit juice, a mineral mother solution, etc. The additive can be a mineral liquid concentrate, or a so-called "functional" concentrate such as an additive comprising a vitamin, caffeine or another coffee extract. The expression "functional concentrate" refers to a product that has an effect on the consumer, such as a product that is probiotic, prophylactic, etc.

Thanks to the relatively large dosing time due to the fact that the dynamic injector follows the container along a portion of its linear trajectory T, the flow rate used for injecting the additive can be kept at a level that does not cause splashing.

It is however apparent in FIG. 1 that such systems for injecting an additive into a container is complex. The carousel must indeed be driven in rotation and each of the dynamic injectors it carries must be supplied with additive. The dynamic injectors 1, 2 must be synchronized with the carousel 3. In other words, the actuation of each dynamic injector 1, 2 to inject an additive is controlled depending on the angular position of the carousel 3. This is necessary to ensure that a container opening is present under the dynamic injector when fluid additive is injected. When changing the additive used (for example when changing the aroma), purging and cleaning the dynamic injectors can be long and complicated.

Figure 2:
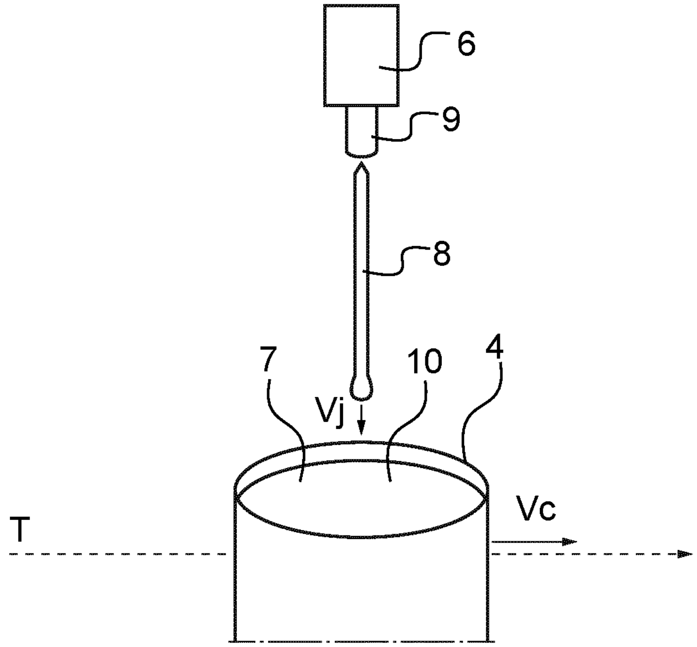
FIG. 2 is a schematic view showing a static microdoser installed above a conveyor conveying a container, the microdoser being installed according to a configuration known in the state of the art.

For those reasons, the use of a simpler device can be envisioned. Static microdosers are known devices for introducing a small quantity of liquid into a product. FIG. 2 is a schematic view showing a static microdoser 6 installed above a conveyor conveying a container, the microdoser 6 being installed according to a configuration known in the state of the art.

In such configuration, the microdoser 6 is positioned above the conveyor (e.g. the conveyor belt) carrying the containers 4. The container 4 follows the linear trajectory T at a constant container speed Vc. When the opening 7 of the container 4 is under the microdoser 6, a jet 8 (or multiple jets 8) of additive issues from a nozzle 9 of the microdoser 6. More particularly, the injection is synchronized with the container motion so that the head and the tail of the jet enters the container by its opening. This requires some "anticipation" of the microdoser opening, as the container opening 7 is not yet in line with the nozzle 9 when the injections starts.

The opening is constituted, in the represented example, by an open upper face of the container 4.

The nozzle 9 is oriented perpendicular to the conveyor carrying the container 4, which defines a substantially horizontal plane. The jet 8 is thus vertical. It has no horizontal component. The jet 8 has a jet speed Vj when it reaches the free surface 10. Indeed, the jet velocity can change from the nozzle 9 to the free surface due to gravity and air friction.

The jet 8 reaches and hits a free surface 10 of the main liquid material present in the container 4 at a right angle. The vertical speed of impact of the jet 8 on the free surface 10 is the jet speed Vj; a horizontal component Vc is also present due to the relative horizontal movement Vc.

Because of the fixed nature of the static microdoser 6, the dosing time is small. It corresponds to the time where the opening 7 is in front of the nozzle 9. It depends on the size of the opening 7 and on the running speed of the conveyor (said running speed being equal to the container speed Vc). For a cylindrical container having a circular open face such as opening 7 having a diameter D, if the nozzle 9 is aligned with the trajectory of the center of the circular opening 7, the dosing time Dt is at most Dt=D/Vc.

However, this configuration has proved to be unsuitable for introducing an additive into a beverage can at high speed. Indeed, the flow rate of additive and thus the jet speed must be high to manage to inject the required additive quantity (e.g. a few milliliters) in dosing time Dt. This causes splashing of liquid (main liquid material and/or additive) out of the container 4.

Figure 3:
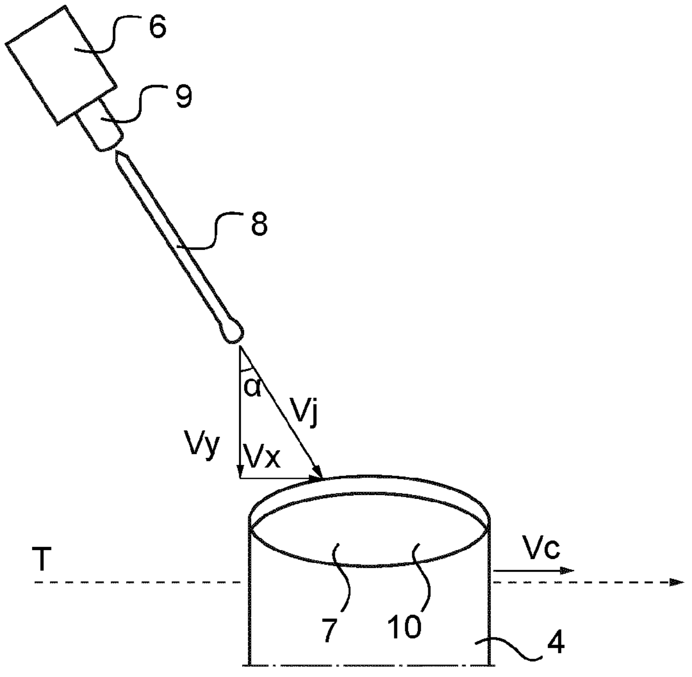
FIG. 3 is a schematic view showing a static microdoser installed above a conveyor conveying a container, the microdoser being installed according to an embodiment of the invention.

FIG. 3 is a schematic view showing a static microdoser 6 installed according to an embodiment of the invention above a conveyor conveying a container 4. The system of FIG. 3 is essentially analogous to the system of FIG. 2, except for the installation configuration of the microdoser 6.

The microdoser 6 is thus positioned above the conveyor (e.g. the conveyor belt) carrying the containers 4. The container 4 follows the linear trajectory T at a constant container speed Vc.

The microdoser is configured to inject an additive, in the form of a jet 8 of additive, into the container 4. The jet can be straight or slightly cone-shaped.

As in FIG. 2, an open upper face of the container 4 constitutes the opening of the container shown in FIG. 3 by way of example.

The container 4 (e.g. a can) is partially filled with a main liquid material. By "partially" it is meant that a sufficient free volume remains in the container to receive the additive. In other words, a sufficient space remains between the free surface 10 (also simply called surface) of the main liquid material and the required final fill point. After introduction of the additive, a sufficient space must remain to allow sealing of the container (e.g. of the can), and to accommodate an empty space under the lid to compensate for thermal expansions.

The static microdoser 6 has, according to the invention, a nozzle 9 inclined to generate a jet 8 of additive that is also inclined relative to the generally used vertical direction of injection.

More particularly, the jet 8 is inclined compared to the vertical direction at an angle $\alpha$.

By "vertical" is meant orthogonal to "horizontal", i.e. orthogonal to the trajectory T of the container, and usually orthogonal to a top surface of the conveyor belt 5.

Thanks to the inclination of the jet 8, the jet speed Vj (when it reaches the free surface 10) can be decomposed into two components, namely a vertical component Vy and a horizontal component Vx (also called jet vertical speed Vy and jet horizontal speed Vx). According to the present invention, the horizontal component Vx of the jet speed Vj has the same orientation and direction as the container speed Vc. This results in a limitation or a cancellation of the horizontal relative speed between the jet 8 and the container 4. The horizontal relative speed between the jet 8 and the container 4 corresponds to Vx minus Vc.

This limitation or cancellation of the horizontal relative speed between the container 4 and the jet 8 appears to be an important parameter to limit splashing. This means that limiting the horizontal speed of the jet when it hits the free surface 10 of the main liquid material present in the container 4 is important to limit formation of waves in the container that could result in splashing. In the envisioned applications (such as beverage canning), a relative horizontal speed between the jet and the container of less than 1.5 m/s, preferably less than 1 m/s, more preferably less than 0.7 m/s provides good results.

The inclination of the jet 8 at an angle $\alpha$ also has the corollary effect of limiting the vertical speed of the jet. For example, an inclination of $\alpha=45°$ leads to reduction by a $\sqrt{2}$ factor of the jet vertical speed Vy. The limitation of the vertical speed Vy of the jet compared to a configuration in which α=0 (i.e. the jet 8 is vertical) leads to a limitation of splashing.

More generally:

$$Vx = Vj \cdot \sin(\alpha);$$

$$\text{and } Vy = Vj \cdot \cos(\alpha)$$

To cancel the horizontal relative speed between the container 4 and the jet 8, the inclination angle α can be determined such that:

$$\alpha = \sin^{-1}\frac{Vc}{Vj}$$

The nozzle can be for example oriented such that jet 8 forms an angle α with the vertical direction comprised between 20° and 50°, preferably between 30° and 45°.

Larger angles α are difficult to implement due to the increasing synchronization difficulties between the can movement and the jet activation.

In the present description the angle α of inclination of the jet 8 is considered to be the same at the exit of the nozzle and at the point of impact on the surface of the main liquid material However, due to gravity the inclination of the jet can be modified between the outlet of the nozzle and the point of impact. The inclination that matters is that at the point of impact. The model used can advantageously take this angle variation into account.

Generally speaking, the limitation or cancellation of the horizontal relative speed between the container 4 and the jet 8 and the limitation of the vertical jet speed Vy limits, for given injection conditions, the impact energy of the jet or jets of additive on the free surface of the main liquid material. The injection conditions include the volume or mass of additive introduced into a container, the dosing time, and the nozzle configuration. The specific kinetic energy (I) transferred at the impact (i.e. kinetic energy per unit area) has proven to be an important parameter that governs splashing, as detailed hereafter. While a system configuration in which the horizontal relative speed between the container 4 and the jet 8 is cancelled does not necessarily corresponds to the configuration in which the specific kinetic energy is the lowest, such configuration is however generally favorable to avoid splashing. Such system configuration, in which the horizontal relative speed between the container 4 and the jet 8 is limited (e.g. to 1 m/s or less) is therefore a good basis for avoiding splashing, and can be further optimized if necessary.

Regarding the influence of nozzle inclination, the applicant has conducted several tests with nozzles at different inclinations, between 0 and 45 degrees and a container speed between 0.33 and 2 m/s. For a constant dosed volume of 0.45 g and with a multihole nozzle covering 24% of the opening width the results are shown in the following table.

In this table, the splashing tendency has been characterized based on a conventional scale (from 1 to 5) in which:

- a wave level up to 1 corresponds to the absence of significant waves.
- a wave level in the range of 1-1.5 corresponds to the absence of waves above the container level;
- a wave level in the range of 1.5-2 corresponds to the presence of some wave of different level appearing above the container limit (i.e. above its opening) but not causing any drip;
- a wave level in the range of 2.5-5 corresponds to presence of waves causing increasing dripping amount.

| Jet vertical speed (m/s) | Jet rel hor speed (m/s) | Wave/ splashing tendency |
|---|---|---|
| 1.10 | 0.77 | 2.5 |
| 1.10 | 0.44 | 2 |
| 1.10 | 0.10 | 1.5 |
| 1.10 | −0.23 | 1 |
| 0.90 | −0.10 | 1 |
| 0.75 | −0.25 | 1 |
| 0.75 | 0.09 | 2 |
| 0.90 | 0.57 | 2 |
| 0.90 | 0.57 | 2 |
| 0.75 | 0.42 | 1 |
| 0.75 | −0.58 | 1.5 |
| 0.90 | −0.43 | 1.5 |
| 0.90 | −0.76 | 1.5 |
| 0.75 | −0.91 | 1.5 |
| 1.10 | −0.56 | 2 |
| 1.37 | −0.66 | 5 |
| 1.15 | −0.66 | 5 |
| 0.94 | −0.66 | 3 |
| 0.94 | −1.33 | 5 |
| 1.15 | −1.33 | 5 |
| 1.37 | −1.33 | 4 |
| 1.25 | −0.61 | 2.5 |
| 1.03 | −0.74 | 1.5 |
| 0.85 | −0.84 | 2.5 |
| 0.85 | −0.17 | 2.5 |
| 1.03 | −0.07 | 2 |
| 1.25 | 0.06 | 1.5 |
| 0.85 | −0.51 | 1.5 |
| 1.03 | −0.41 | 1 |
| 0.85 | −1.17 | 2 |

Figure 4:
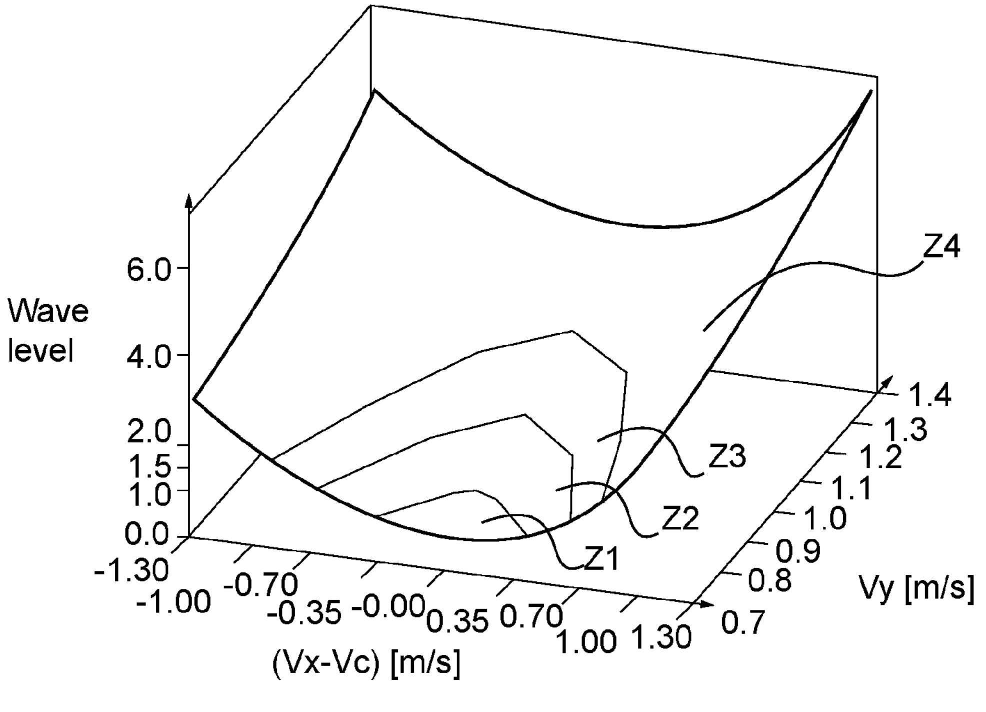
FIG. 4 is an example cartography that can be used in an embodiment of the invention.

As shown in FIG. 4, the data have been exploited to build a response surface model in function of the relative horizontal speed and vertical speed, highlighting an optimal working zone.

FIG. 4 is more particularly a three-dimension cartography established for a given nozzle. This cartography shows the wave level, according the above-explained conventional scale, depending on the relative horizontal speed (Vx minus Vc) and vertical speed Vy of the jet.

A first zone Z1 corresponds to the zone in which no significant wave is formed, and the wave level is of 1 or less. In a second zone Z2, the wave level is in the range of 1-1.5 and corresponds to the presence of some small waves, remaining under the top end of the container. In a third zone Z3, waves are formed, some of which appearing above the container opening, but not causing any drip. A fourth zone Z4 corresponds to the zone in which the wave level is above 2, possibly causing splashing.

Thanks to such cartography, the inclination of the nozzle (and possibly the jet speed) can be adjusted so that the system remains in an acceptable working zone, i.e. in the first zone Z1 or in the second zone Z2, and in the worst case in the third zone Z3.

The obtained results suggest that, in the example conditions used for those tests, a relative horizontal speed of less than 1 m/s is necessary to obtain acceptable results. Cancelling the relative speed or obtaining a negative speed (i.e. the container has a slightly higher speed than the horizontal component of the jet speed) between 0 and −1 m/s could also generate acceptable results.

Also, acceptable and good results have been obtained with jet vertical speed of less than 1.2 m/s.

Generally, a spread of the mechanical energy of the jet 8 to be absorbed at the free surface 10 of the main liquid material is helpful to avoid splashing. This is why, in addition to the inclination proposed in the present invention, the applicant has developed multiple orifice nozzles such as that presented in FIG. 5.

Figure 5:
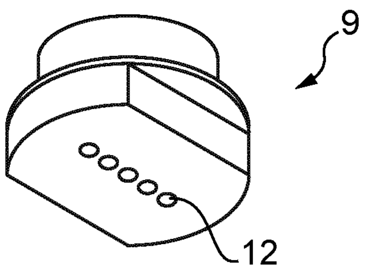
FIG. 5 is a three-dimensional schematic view showing a nozzle that can be used in an embodiment of the invention.

FIG. 5 is a three-dimensional schematic view showing a nozzle that can be used in an embodiment of the invention. The nozzle 9 of FIG. 5 comprises multiple injection holes 12. In the represented nozzle embodiment, the nozzle 9 comprises five holes 12.

The nozzle 9 is configured so that a separate jet 8 comes out of each of the nozzle holes 12. This makes it possible to increase the free surface 10 of the main liquid material present in the container which is hit during the injection of the additive. Indeed, the total quantity of injected additive is distributed in several jets.

Corollary, for the same energy per unit area of the free surface of the main liquid material impacted by the jets 8 of the nozzle 9, it is possible to inject more additive in a given time.

Figure 6:
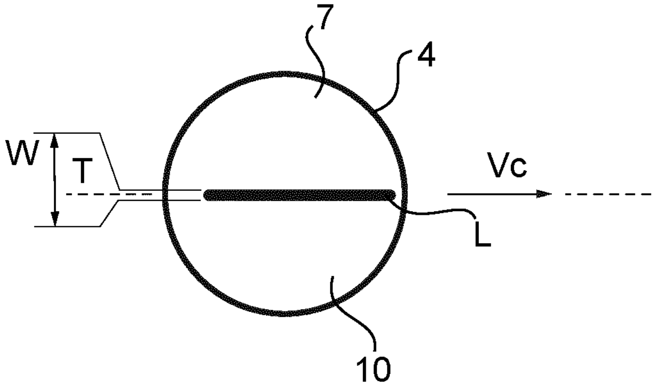
FIG. 6 is a schematic view of a container seen from above, as illustration of an aspect of the invention.
Figure 7:
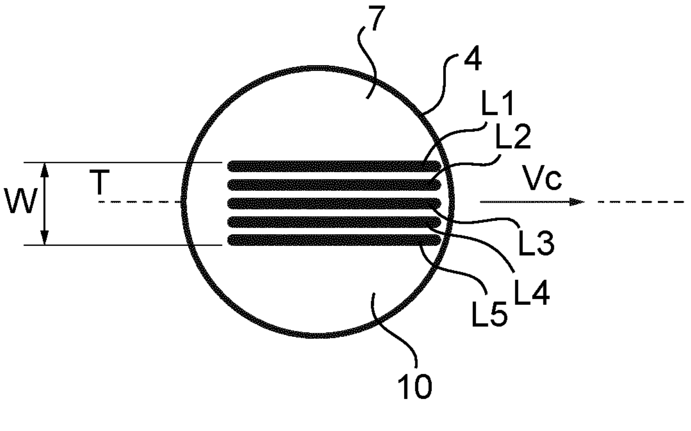
FIG. 7 is another schematic view of a container seen from above, as illustration of an aspect of the invention.

This result will be better understood by a comparison between FIG. 6 and FIG. 7.

FIG. 6 and FIG. 7 are schematic views from above of a container 4, namely a cylindrical can.

In FIG. 6, the nozzle used for injecting the additive has a single hole. It therefore forms a single additive jet. Consequently, the zone of the free surface of the main liquid material contained in the container impacted by the jet of additive forms a straight impact path L over said free surface. The impact path L is aligned with the trajectory T of the container. Preferably, the impact path L is aligned with the center of the container, to maximize its length.

In FIG. 7, the nozzle used for injecting the additive has multiple holes aligned transversally to the can movement. It therefore forms several additive jets. Consequently, the zone of the free surface of the main liquid material contained in the container impacted by the jet of additive is formed of as many a straight impact paths L1 . . . L5 over said free surface as the number of holes present on the nozzle 9. The impact paths L1 . . . L5 are parallel. They are also parallel to the linear trajectory T of the container. Such configuration spreads the impact energy of the injected additive over the free surface of the main liquid material contained in the container 4. For a given quantity of additive injected, the flow rate and the speed of each jet can be lowered. The size (i.e. diameter or frontal surface) of each jet can be reduced, which is also beneficial for limiting splashing.

The applicant has studied influence of the width of the jet or jets on the area of the free surface 10 of the main liquid where additive can be injected, in a cylindrical container.

The greatest possible area is obtained with a jet (or jets) having a width W of around 49% of the diameter of the container. An area of 50% of this greatest possible area is still obtained with a jet (or jets) having a width W of around 18%, or around 68%, of the diameter of the container. Under 18% and above 68%, the area of the free surface 10 of the main liquid impacted by the jet (or jets) decreases rapidly.

The applicant has thus found that the optimal inclination to combine the splashing avoidance effects of the inclination of the nozzle and of the increase of the area of the free surface of the main liquid material impacted by the jet (or jets) of additive is between 30 and 45°. The optimal width W is around 49% of the can (or other circular container) diameter.

Finally, the Application observed experimentally that the height of the nozzle affects the wave formation inside the can; this is due to the jet acceleration before hitting the free surface of the main liquid material when the nozzle is away from this free surface. It is therefore preferable to reduce this distance. A distance between the nozzle and the container of about 10 mm has been found to be relevant.

The tests detailed above show how, for given dosage conditions, it is possible to optimize the system according to the invention to avoid splashing. More generally, it is advantageous to be able to adapt the conditions of the additive dosage in order to carry out the desired introduction of additive into the container.

Based on the above findings, additional tests have been performed to assess the influence of several parameters on splashing.

The parameters changed in those tests are indicated in the following table.

| Parameter | Range | Note |
|---|---|---|
| Container speed (Vc) | 0.33-1.66 m/s | Corresponds to the speed of the conveyor |
| Jet speed (Vj) | 1.2-4.8 m/s | Speed at the impact point |
| Nozzle distance from the can | 1.0-2.0 mm | |
| Jet inclination | 0°-50° | 0° means vertical jet |
| Types of nozzles | 6 different shapes | |
| Impact width (W) | 4-14 mm | Depending on the type of nozzle |

The results obtained show that the splashing phenomenon depends on the specific energy (energy per unit area) transferred by the jet or jets to the impacted surface of the main liquid material contained in the container.

More particularly, the specific kinetic energy I is taking in consideration the kinetic energy Ek transferred by the jet to the impacted surface of the can A:

$$I = \frac{E_k}{A}$$

The kinetic energy of the jet or jets is calculated considering the additive mass m (cumulated mass of the jet or jets, i.e. the mass of additive introduced into the container by the microdoser) and its impact speed V (relative speed between the jet or jets and the surface of the main liquid material):

$$E_k = \frac{1}{2} m * V^2$$

For example, if Vx=Vc, V=Vy.
More generally, $$V = \sqrt{Vy^2 + (Vc - Vx)^2}$$

The impacted surface area (A) is calculated as:

$$A = \text{Impact width} \times \text{Impact length}$$

The Impact width depends on the jet width.

The Impact length depends on the relative horizontal speed between the jet or jets and the container and on the dosing time. It can be calculated or measured with a video camera observing the impact zone of the jet or jets on the free surface of the main liquid material.

For nozzles generating multiple jets that hits the main liquid material in separated areas, the impacted surface area will be calculated as the sum of the areas impacted by the jets.

The quality of the injection has been evaluated in terms of wave rate, using high-speed camera recording, with the following rating:

0 corresponds to an additive injection with no product splashing out of the container;

1 corresponds to an additive injection resulting in product splashing out of the can; and 0.5 corresponds to an intermediate result, in which splashing occasionally occurs.

Figure 8:
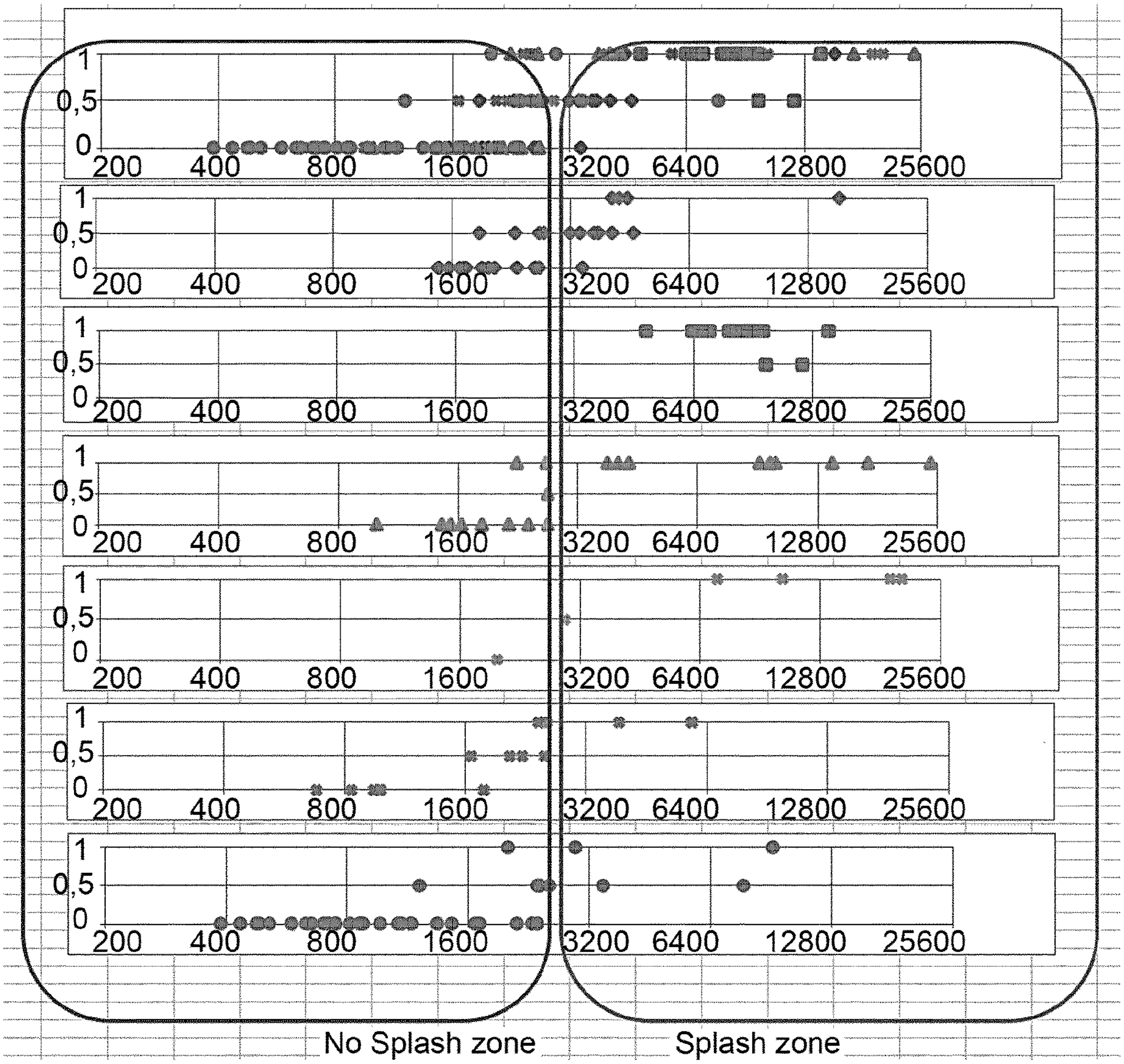
FIG. 8 is a graph showing the influence, on the splashing phenomenon, of the specific kinetic energy transferred at the impact of the additive to the main liquid material present in the container.

The results are shown in FIG. 8, in which the wave rate (0, 0.5 or 1), for 110 conducted tests has been plotted in function of the specific kinetic energy I.

In FIG. 8, seven graphs are represented. Each graph represents the wave rate on the y-axis and the specific kinetic energy on the x-axis.

The graph at the top of FIG. 8 is the aggregation of the six graphs shown below. Each of these six graphs corresponds to the results obtained with a different nozzle. The six-tested nozzle are highly different in terms of number, size, form of their injection holes, and resulting impact width.

The main teaching of these tests is that the splashing phenomenon is highly dependent on the specific kinetic energy of the impact of the jet or jets of additive on the free surface of the main liquid material present in the container.

It is possible to separate roughly two zones on the graph of FIG. 8. In a first zone ("no splash zone") no splashing occurs, or very infrequently. In a second zone ("splash zone") splashing occurs frequently or always.

The limit between these zones is around a specific kinetic energy of the order of 3000 mJ/m$^2$. Nevertheless, in order to limit the number of occasional splashes, it is advantageous to configure the dosing system to limit the specific kinetic energy of the impact of the jet or jets to approximately 2000 mJ/m$^2$.

It should be understood that various changes and modifications to the presently preferred embodiments described herein will be apparent to those skilled in the art. Such changes and modifications can be made without departing from the spirit and scope of the present invention and without losing its attendant advantages. It is therefore intended that such changes and modifications be covered by the appended claims.

The results and detailed embodiments are only provided by way of example. Depending on the application, the size of the container, the physical properties of the main liquid material and of the additive (e.g. their respective viscosities and more generally their mechanical behaviors) various changes and modifications to the presently preferred embodiments described herein will be apparent to those skilled in the art.

The invention finds a preferred, but of course not exclusive, application in the introduction of a flavouring concentrate in cans for beverages preparation, such as flavoured water and soda preparation.

The invention claimed is:

1. A system for introducing an additive into a container partially filled with a main liquid material, the system comprising an automated conveyor for transporting the container along a straight horizontal trajectory (T) at a substantially constant container speed (Vc), the system further comprising a static microdoser having a nozzle from which at least one jet of an additive issues upon passage of an opening of the container in proximity to the nozzle to introduce the additive into said container, wherein the nozzle of the microdoser is inclined relative to a vertical direction that is perpendicular to the trajectory (T), wherein the system is configured to introduce a given quantity of additive into the container, said quantity having a mass (m), the at least one jet hits a free surface of the main liquid material at a relative impact speed (V), over an area A of said free surface of the main liquid material; and the system is configured, with regard to the inclination of the nozzle, to the number, the shape and the speed (Vj) of the at least one jet, to the mass (m), and to the container speed (Vc), such that the specific kinetic energy (I) of the impact of the at least one jet on the free surface of the main liquid material, defined by the formula:

$$I = \frac{\frac{1}{2} m * V^2}{A}$$

is less than 3000 mJ/m$^2$.

2. A system according to claim 1, wherein it is configured such that the specific kinetic energy (I) is less than 2000 mJ/m$^2$.

3. A system according to claim 1, wherein the at least one jet has vertical and horizontal speed components that are non-null, the horizontal speed component (Vx) of the jet being substantially parallel to the trajectory (T) of the container, and wherein the inclination of the nozzle, the speed of the at least one jet issued from the nozzle and the container speed (Vc) are configured such that a relative horizontal speed between the jet and the container is less than 1 m/s.

4. A system according to claim 1, wherein the nozzle is oriented such that the at least one jet issued from the nozzle forms an angle with the vertical direction comprised between 20° and 50°.

5. A system according to claim 1, wherein the jet vertical speed (Vy) of the at least one jet is less than 1.2 m/s.

6. A system according to claim 1, wherein the container speed Vc is higher than 0.6 m/s.

7. A system according to claim 1, wherein the nozzle-comprises a plurality of holes, so that a plurality of jets having parallel trajectories are issued from the nozzle upon passage of the opening of the container in proximity to the nozzle.

8. A system according to claim 7, wherein the nozzle comprises two to thirty holes.

9. A system according to claim 1, wherein the system comprising a container, wherein the container has an open upper face forming its opening.

10. A system according to claim 9, wherein the container is a can.

11. A system according to claim 9, wherein the system is configured so that each jet of additive hits a free surface of the main liquid material along a straight horizontal path over a length of at least 40% of the length of the free surface of the main liquid material along this path.

12. A system according to claim 11, wherein the container has a cylindrical shape, wherein at least one jet of additive hits the free surface of the main liquid material along a diameter of the container.

13. A system according claim 12, wherein the at least one jet of additive hits the free surface-of the main liquid material over a width (W) comprised between 18% and 68% of the diameter the container.

14. A system according to claim 1, wherein the main liquid material is selected from the group consisting of water, a soda, lemonade, and a soup.

15. A system according to claim 1, wherein the additive is selected from the group consisting of an edible flavouring concentrate, a mineral concentrate, and a functional concentrate.

* * * * *